(12) United States Patent
Clarke et al.

(10) Patent No.: US 7,169,451 B2
(45) Date of Patent: *Jan. 30, 2007

(54) GAS-PERMEABLE MEMBRANE

(75) Inventors: Raymond Clarke, Los Altos, CA (US); Ray F. Stewart, Redwood City, CA (US); Valentine Y. Yoon, Santa Barbara, CA (US); Donald A. Schultz, San Mateo, CA (US); Bradley McClary, Elkton, CA (US)

(73) Assignee: Landec Corporation, Menlo Park, CA (US)

( * ) Notice: Subject to any disclaimer, the term of this patent is extended or adjusted under 35 U.S.C. 154(b) by 381 days.

This patent is subject to a terminal disclaimer.

(21) Appl. No.: 09/976,987

(22) Filed: Oct. 12, 2001

(65) Prior Publication Data

US 2002/0054969 A1 May 9, 2002

Related U.S. Application Data (63) Continuation of application No. 08/759,602, filed on Dec. 5, 1996, now Pat. No. 6,376,032, which is a continuation of application No. PCT/US96/07939, filed on May 29, 1996, and a continuation-in-part of application No. 08/453,018, filed on May 30, 1995, now abandoned.

(51) Int. Cl.
*B32B 1/08* (2006.01)

(52) U.S. Cl. ............... 428/35.2; 428/34.7; 428/137; 428/315.9; 428/447; 428/500; 426/106; 426/118

(58) Field of Classification Search ............ 428/35.2, 428/34.7, 315.9, 137, 447, 500; 426/106, 426/118
See application file for complete search history.

(56) References Cited

U.S. PATENT DOCUMENTS

| 2,611,709 A | 9/1952 | Plagge .................. 99/171 |
| 3,102,777 A | 9/1963 | Bedrosian et al. ........... 21/58 |

(Continued)

FOREIGN PATENT DOCUMENTS

| EP | 0178218 | 4/1986 | |
| EP | 0230191 A1 | 7/1987 | ............ 426/419 |

(Continued)

OTHER PUBLICATIONS

P. Veeraju and M. Karel, "Controlling Atmosphere In A Fresh–fruit Package," p. 168–174, 254, Oct. 1966, *Modern Packaging*.

H. Daun & Seymour G. Gilbert, "Film Permeation: The Key to Extending Fresh Produce Shelf Life," p. 50–53, Aug. 1974, *Package Engineering*.

*Primary Examiner*—Patrick Joseph Ryan
*Assistant Examiner*—Jane Rhee
(74) *Attorney, Agent, or Firm*—Sheldon & Mak PC

(57) ABSTRACT

Novel gas-permeable membranes which are particularly useful in the packaging of fresh cut fruit and vegetables, and other respiring biological materials. The membranes have an $O_2$ permeability of at least 775,000 ml/m². atm.24 hrs, a $P_{10}$ ratio of at least 1.3, and a ratio of $CO_2$ permeability to $O_2$ permeability (R) of at least 1.5, and are made by forming thin polymeric coatings on microporous polymeric films. Preferred coating polymers are side chain crystalline polymers. Preferred microporous films contain inorganic fillers, particularly such films based on ultrahigh molecular weight polyethylene or polypropylene. FIG. 1 illustrates how $O_2$ permeability and R ratio vary for different coating polymers and microporous films.

65 Claims, 3 Drawing Sheets

U.S. PATENT DOCUMENTS

| | | |
|---|---|---|
| 3,423,212 A | 1/1969 | Purcell et al. ............... 99/171 |
| 3,450,542 A | 6/1969 | Badran ....................... 99/154 |
| 3,450,543 A | 6/1969 | Badran et al. ............... 99/171 |
| 3,450,544 A | 6/1969 | Badran et al. ............... 99/171 |
| 3,507,667 A | 4/1970 | Magnen ....................... 99/171 |
| 3,625,876 A | 12/1971 | Fitko ........................ 260/23.7 |
| 3,630,759 A | 12/1971 | Rumberger .................. 99/171 |
| 3,706,410 A | 12/1972 | Baker ...................... 229/16 R |
| 3,795,749 A | 3/1974 | Cummin et al. ............. 426/316 |
| 3,798,333 A | 3/1974 | Cummin et al. ............. 426/106 |
| 3,804,961 A | 4/1974 | Cummin et al. ............. 426/415 |
| 3,844,865 A | 10/1974 | Elton et al. ................. 156/229 |
| 3,903,234 A | 9/1975 | Ikeda et al. ................. 264/210 |
| 3,932,692 A | 1/1976 | Hirata et al. ................ 428/474 |
| 3,975,455 A | 8/1976 | Falender et al. ........... 260/827 |
| 4,055,672 A | 10/1977 | Hirsch et al. ............... 426/127 |
| 4,153,659 A | 5/1979 | Recktenwald et al. ........ 264/83 |
| 4,176,148 A | 11/1979 | Magder et al. ............... 264/41 |
| 4,209,538 A | 6/1980 | Woodruff .................... 426/314 |
| 4,224,347 A | 9/1980 | Woodruff .................... 426/106 |
| 4,347,844 A | 9/1982 | Ohki et al. ................. 128/287 |
| 4,350,655 A | 9/1982 | Hoge ........................ 264/145 |
| 4,353,799 A | 10/1982 | Leonard .................. 210/321.3 |
| 4,386,129 A | 5/1983 | Jacoby ....................... 428/215 |
| 4,394,930 A | 7/1983 | Korpman .................... 220/444 |
| 4,423,080 A | 12/1983 | Bedrosian et al. ........... 426/124 |
| 4,461,420 A | 7/1984 | Horvath ...................... 229/43 |
| 4,472,328 A | 9/1984 | Sugimoto et al. ............. 264/41 |
| 4,485,133 A | 11/1984 | Ohtsuka et al. ............... 428/35 |
| 4,487,791 A | 12/1984 | Komatsu et al. .............. 428/35 |
| 4,513,015 A | 4/1985 | Clough ...................... 426/396 |
| 4,515,266 A | 5/1985 | Myers ....................... 206/205 |
| 4,528,235 A | 7/1985 | Sacks et al. ................. 428/220 |
| 4,698,372 A | 10/1987 | Moss ........................ 521/145 |
| 4,704,238 A | 11/1987 | Okuyama et al. .............. 264/41 |
| 4,705,812 A | 11/1987 | Ito et al. .................... 521/92 |
| 4,705,813 A | 11/1987 | Ito et al. .................... 521/92 |
| 4,734,326 A | 3/1988 | Nishimatsu et al. ........ 428/317 |
| 4,769,262 A | 9/1988 | Ferrar et al. ................. 428/35 |
| 4,830,863 A | 5/1989 | Jones ....................... 426/118 |
| 4,833,172 A | 5/1989 | Schwarz et al. ............. 521/62 |
| 4,840,823 A | 6/1989 | Chigami et al. ........... 428/35.5 |
| 4,842,875 A | 6/1989 | Anderson ................... 426/118 |
| 4,847,145 A | 7/1989 | Matsui ....................... 428/323 |
| 4,861,644 A | 8/1989 | Young et al. ............... 428/195 |
| 4,863,788 A | 9/1989 | Bellairs et al. ............. 428/246 |
| 4,876,146 A | 10/1989 | Isaka et al. ................. 428/347 |
| 4,877,679 A | 10/1989 | Leatherman et al. ........ 428/224 |
| 4,879,078 A | 11/1989 | Antoon, Jr. .................. 264/41 |
| 4,883,674 A | 11/1989 | Fan .......................... 426/118 |
| 4,886,372 A | 12/1989 | Greengrass et al. ........ 383/100 |
| 4,892,779 A | 1/1990 | Leatherman et al. ........ 428/220 |
| 4,910,032 A | 3/1990 | Antoon, Jr. ................. 426/118 |
| 4,923,650 A | 5/1990 | Antoon, Jr. et al. .......... 264/41 |
| 4,923,703 A | 5/1990 | Antoon, Jr. ................. 426/118 |
| 4,937,115 A | 6/1990 | Leatherman ............... 428/36.4 |
| 4,939,030 A | 7/1990 | Tsuji et al. ............... 428/315.5 |
| 4,943,440 A | 7/1990 | Armstrong ................. 426/118 |
| 4,956,209 A | 9/1990 | Isaka et al. ................ 428/35.2 |
| 4,960,639 A | 10/1990 | Oda et al. .................. 428/34.5 |
| 5,008,296 A | 4/1991 | Antoon, Jr. et al. .......... 521/91 |
| 5,011,698 A | 4/1991 | Antoon, Jr. et al. ........ 426/395 |
| 5,026,591 A | 6/1991 | Henn et al. ................. 428/198 |
| 5,032,450 A | 7/1991 | Rechlicz et al. ............ 428/196 |
| 5,035,933 A | 7/1991 | Ilenda et al. ............... 428/36.6 |
| 5,045,331 A | 9/1991 | Antoon, Jr. ................. 426/118 |
| 5,126,197 A | 6/1992 | Schinkel et al. ............ 428/349 |
| 5,153,039 A | 10/1992 | Porter et al. ............. 428/36.92 |
| 5,160,768 A | 11/1992 | Antoon, Jr. ................ 428/35.2 |
| 5,164,258 A | 11/1992 | Shida et al. ............... 428/319.3 |
| 5,196,262 A | 3/1993 | Schwarz et al. .......... 428/315.5 |
| 5,221,571 A | 6/1993 | Cammiss et al. ............ 428/220 |
| 5,254,354 A | 10/1993 | Stewart ...................... 426/106 |
| 5,256,473 A | 10/1993 | Kotani et al. ............... 428/218 |
| 5,271,976 A | 12/1993 | Kondo et al. .............. 428/35.2 |
| 5,275,854 A | 1/1994 | Maier et al. ............... 428/36.5 |
| RE34,537 E | 2/1994 | Deyrup ...................... 428/35.7 |
| RE34,546 E | 2/1994 | Deyrup ...................... 525/674 |
| 5,300,570 A | 4/1994 | Ilenda et al. ................. 525/80 |
| 5,322,726 A | 6/1994 | Dew ......................... 428/216 |
| 5,332,617 A | 7/1994 | Mills et al. ................. 428/215 |
| 5,362,531 A | 11/1994 | Samuel et al. ............. 428/36.6 |
| 5,411,351 A | 5/1995 | Lasch et al. .................. 404/14 |
| 5,532,053 A | 7/1996 | Mueller ...................... 428/287 |

FOREIGN PATENT DOCUMENTS

| | | | |
|---|---|---|---|
| EP | 0270764 | 6/1988 | |
| EP | 0351115 | 3/1989 | |
| EP | 0351116 | 3/1989 | |
| FR | 1590579 | 5/1970 | |
| FR | 2033541 | 12/1970 | |
| FR | 2531042 | 2/1984 | |
| JP | 4717187 | 6/1972 | |
| JP | 538781 | 1/1978 | |
| JP | 5610459 | 2/1981 | |
| JP | 1264031 | 5/1985 | |
| JP | 62288640 | 12/1987 | |
| JP | 6227438 | 2/1994 | |
| JP | 6210141 | 8/1994 | |
| SU | 719555 | 3/1980 | ............... 426/419 |
| SU | 740190 | 6/1980 | |
| SU | 829484 | 5/1981 | |
| WO | 9216434 | 3/1991 | |
| WO | 9210414 | 6/1992 | |
| WO | 9412040 | 6/1994 | |

GAS-PERMEABLE MEMBRANE

CROSS-REFERENCE TO RELATED APPLICATIONS

This application is a continuation of copending application Ser. No. 08/759,602, filed Dec. 5, 1996, by Raymond Clarke, Ray Stewart, Valentine Yoon, Donald Schultz and Bradley McClary. Ser. No. 08/759,602 is a continuation-in-part of application Ser. No. 08/453,018, filed May 30, 1995, by Raymond Clarke, Ray Stewart, Valentine Yoon, Donald Schultz and Bradley McClary, now abandoned. This application is also a continuation of International Application number PCT/U.S. 96/07939, filed May 29, 1996, by Landec Corp., naming Raymond Clarke, Ray Stewart, Valentine Yoon, Donald Schultz and Bradley McClary as inventors. The entire disclosure of each of Ser. Nos. 08/453,108 and 08/759,602 and PCT/U.S. 96/0939 is incorporated herein by reference for all purposes.

BACKGROUND OF THE INVENTION

1. Field of the Invention

This invention relates to gas-permeable membranes and their use in packaging, especially the packaging of fresh produce.

2. Introduction to the Invention

Fresh cut fruit and vegetables, and other respiring biological materials, consume oxygen ($O_2$) and produce carbon dioxide ($CO_2$), at rates which depend upon temperature and the stage of their development. Their storage stability depends on the relative and absolute concentrations of $O_2$ and $CO_2$ in the atmosphere surrounding them, and on temperature. Ideally, a respiring material should be stored in a container whose permeability to $O_2$ and $CO_2$ is correlated with (i) the atmosphere outside the package, (ii) the rates at which the material consumes $O_2$ and produces $CO_2$, and (iii) the temperature, to produce an atmosphere within the container having $O_2$ and $CO_2$ concentrations equal to the optimum values for preservation of the material. The permeability to water vapor may also be significant. This is the principle behind the technology of controlled atmosphere packaging (CAP) and modified atmosphere packaging (MAP), as discussed, for example, in U.S. Pat. No. 4,734,324 (Hill), U.S. Pat. No. 4,830,863 (Jones), U.S. Pat. No. 4,842,875 (Anderson), U.S. Pat. No. 4,879,078 (Antoon), U.S. Pat. No. 4,910,032 (Antoon), U.S. Pat. No. 4,923,703 (Antoon), U.S. Pat. No. 5,045,331 (Antoon), U.S. Pat. No. 5,160,768 (Antoon) and U.S. Pat. No. 5,254,354 (Stewart), and European Patent Applications Nos. 0,351,115 and 0,351,116 (Courtaulds). The disclosure of each of these publications is incorporated herein by reference.

The preferred packaging atmosphere depends on the stored material. For example, some materials, e.g. broccoli, are best stored in an atmosphere containing 1–2% $O_2$ and 5–10% $CO_2$. For other materials, an atmosphere containing 1–2% $O_2$ and 12–30% $CO_2$, e.g. about 15% $CO_2$, is preferred. Thus, $CO_2$ concentrations of 10 to 30% slow the respiration rate of some fruit and reduce the activity of some decay-causing organisms; for example, a $CO_2$ concentration of 20% delays grey mold decay in rasberries and extends their shelf life.

SUMMARY OF THE INVENTION

Although much research has been carried out, known packaging techniques have many shortcomings for respiring biological materials. We have discovered, in accordance with this invention, that by forming thin polymeric coatings on microporous films, it is possible to create gas-permeable membranes which have novel and desirable combinations of $O_2$ permeability, change in $O_2$ permeability with temperature, and ratio of $CO_2$ permeability to $O_2$ permeability. Improved results can be obtained using a wide range of microporous base films and coating polymers. However, a particular advantage of the present invention is that it makes it possible to design packages which are tailored to the requirements of particular respiring materials. As further discussed below, the gas-permeable membranes of this invention are generally used as control sections which provide the sole, or at least the principal, pathway for gases to enter or leave a sealed container containing a respiring material.

In describing the invention below, the following abbreviations, definitions, and methods of measurement are used. OTR is $O_2$ permeability. COTR is $CO_2$ permeability. OTR and COTR values are given in ml/m$^2$.atm.24 hrs, with the equivalent in cc/100 inch$^2$.atm.24 hrs given in parentheses. OTR and COTR were measured using a permeability cell (supplied by Millipore) in which a mixture of $O_2$, $CO_2$ and helium is applied to the sample, using a pressure of 0.7 kg/cm$^2$ (10 psi) except where otherwise noted, and the gases passing through the sample were analyzed for $O_2$ and $CO_2$ by a gas chromatograph. The cell could be placed in a water bath to control the temperature. The abbreviation $P_{10}$ is used to denote the ratio of the oxygen permeability at a first temperature $T_1$° C. to the oxygen permeability at a second temperature $T_2$, where $T_2$ is $(T_1-10)$° C., $T_1$ being 10° C. and $T_2$ being 0° C. unless otherwise noted. The abbreviation R is used to denote the ratio of $CO_2$ permeability to $O_2$ permeability, both permeabilities being measured at 20° C. unless otherwise noted. Pore sizes given in this specification are measured by mercury porosimetry or an equivalent procedure. Parts and percentages are by weight, temperatures are in degrees Centigrade, and molecular weights are weight average molecular weights expressed in Daltons. For crystalline polymers, the abbreviation $T_o$ is used to denote the onset of melting, the abbreviation $T_p$ is used to denote the crystalline melting point, and the abbreviation $\Delta H$ is used to denote the heat of fusion. $T_o$, $T_p$ and $\Delta H$ are measured by means of a differential scanning calorimeter (DSC) at a rate of 10° C./minute and on the second heating cycle. $T_o$ and $T_p$ are measured in the conventional way well known to those skilled in the art. Thus $T_p$ is the temperature at the peak of the DSC curve, and $T_o$ is the temperature at the intersection of the baseline of the DSC peak and the onset line, the onset line being defined as the tangent to the steepest part of the DSC curve below $T_p$.

Typically, a microporous film has an R ratio of about 1, and OTR and COTR values which (i) are very high, (ii) do not change much with the thickness of the film, and (iii) do not change much with temperature (leading to $P_{10}$ ratios of about 1). A continuous polymeric layer, on the other hand, typically has an R ratio substantially greater than 1 (generally 2 to 6, depending on the polymer itself), and has OTR and COTR values which (i) are relatively low, (ii) are inversely proportional to the thickness of the layer, and (iii) change substantially with temperature (leading to $P_{10}$ ratios substantially greater than 1, generally at least 1.3). At practical thicknesses, such continuous polymeric layers have OTR and COTR values which are undesirably low.

We have discovered that when a membrane is prepared by coating a thin layer of a polymer onto a suitable microporous film, it has permeability characteristics which depend on both the coating polymer and the microporous film. We do not know exactly why this is so, and the results achieved by this invention do not depend upon any theory of its operation. However, we believe that the coating polymer effectively blocks most, but not all, of the pores of the microporous film (with the smaller pores being preferentially blocked); and that as a result, the permeability of the membrane results in part from gases which pass through the unblocked pores and in part from gases which pass through the coating polymer. In any event, the invention makes it possible to prepare novel membranes having very desirable permeability characteristics, and to achieve controlled variation of those characteristics. For example, the invention makes it possible to prepare membranes having an OTR greater than 775,000 (50,000), e.g. 1,550,000 (100,000) to 3,875,000 (250,000), or even higher, e.g. up to 7,750,000 (500,000) or more, a $P_{10}$ ratio of at least 1.3, e.g. at least 2.6, and an R ratio of at least 1.5, e.g. at least 2.0.

The microporous film and the coating polymer must be selected and correlated to produce a membrane having particular properties, but those skilled in the art will have no difficulty, having regard to the disclosure in this specification and their own knowledge, in achieving a wide range of useful results.

The size and distribution of the pores in the microporous film are important factors. If the pores are too small, the coating polymer tends to form a continuous layer which is either too thin to be durable under routine handling, or too thick to have an acceptable OTR. If the pores are too large, the coating polymer may be unable to bridge over them, so that the coating polymer plays little or no part in determining the permeability characteristics of the membrane. This may happen even if the average pore size is relatively low, if the pores have a wide range of sizes; for example the coating polymer may effectively block many of the pores, but still fail to block the larger pores, whose permeability then dominates the permeability of the membrane as a whole.

The roughness of the microporous film can also be an important factor. The coating weight of the coating polymer must be very small, and in consequence the thickness of the coating polymer is also very small. If such a thin layer is in intimate contact with an irregular surface, it is more likely to be able to withstand abrasive forces during use than a layer of the same thickness which lies on a relatively smooth surface.

The coating polymer should be selected so that the membrane has a desired $P_{10}$ ratio and a desired R ratio, and should be coated onto the microporous film at a coating weight which results in a membrane having the desired balance between the permeability characteristics of the microporous film and of the coating polymer. For example, by choosing a crystalline coating polymer whose $T_p$ is within or a little below an expected range of storage temperatures, it is possible to produce a membrane whose $P_{10}$ is relatively large in the storage temperature range; furthermore, the size of the $P_{10}$ ratio can be increased by increasing the ΔH of the coating polymer. Similarly, a membrane having a relatively large (or small) R ratio can be produced by selecting a coating polymer having a relatively high (or small) inherent R ratio. In this way, the invention makes it possible to produce membranes whose properties can be tailored, much more closely than was previously possible, to the needs of a particular respiring biological material.

In a first preferred aspect, this invention provides a gas-permeable membrane which comprises (a) a microporous polymeric film, and (b) a polymeric coating on the microporous film, the polymeric coating changing the permeability of the microporous film so that the membrane (i) has a $P_{10}$ ratio, over at least one 10° C. range between −5 and 15° C., of at least 1.3;

(ii) has an oxygen permeability (OTR), at all temperatures between 20° and 25° C., of at least 775,000 ml/m².atm.24 hrs (50,000 cc/100 inch².atm.24 hrs); and (iii) has an R ratio of at least 1.5;

the $P_{10}$, OTR and R values being measured at a pressure of 0.035 kg/cm².

In a second preferred aspect, this invention provides a package which is stored in air and which comprises:

(a) a sealed container, and (b) within the sealed container, a respiring biological material and packaging atmosphere around the biological material;

the sealed container including one or more permeable control sections which provide at least the principal pathway, and optionally substantially the only pathway, for oxygen and carbon dioxide to enter or leave the packaging atmosphere, at least one said permeable control section being a gas-permeable membrane as defined in the first aspect of the invention.

BRIEF DESCRIPTION OF THE DRAWING

The invention is illustrated in the accompanying drawings, in which each of the Figures illustrates the relationship between the OTR and the R ratio of particular membranes, as explained in detail in the specific examples.

DETAILED DESCRIPTION OF THE INVENTION

Microporous Base Films

The microporous base film used in this invention comprises a polymeric matrix which provides a network of interconnected pores such that gases can pass through the film. The average pore size of the base film can be 0.02 to 5 micron, but is preferably greater than 0.05 micron and less than 0.24, particularly less than 0.20, especially less than 0.15, micron. Preferably at least 70%, particularly at least 90%, of the pores have a pore size of less than 0.24 micron. Preferably at least 60%, particularly at least 80%, of the pores have a a pore size of less than about 0.15 micron. Particularly at least 60%, especially at least 70%, of the pores have a pore size of less than about 0.11 micron. The pores preferably constitute 35 to 80%, particularly 60 to 75%, by volume of the film. A narrow range of pore sizes is preferred. For example, it is preferred that less than 20% of the pores have a size less than 0.014 micron, and that less than 20% of the pores have a pore size greater than 0.13 micron.

It is highly desirable that the base film should have sufficient strength (and other physical properties) to ensure that it is not damaged in processing or in use as part of a container. Accordingly, the base film preferably has a tear strength of at least 30 g, particularly at least 70 g, when measured by the following test. A sample of the film, 10 by 1.27 cm, is used. A slit 5 mm long is made in one of the short sides. The two flaps on either side of the slit are placed in opposing jaws of an Instron tensile tester, and the tear strength measured at a jaw separation rate of 12.7 cm (5 inch)/minute. If the base film has too low a tear strength, it is possible to prepare a satisfactory membrane by laminating the base film, before or after it has been coated, to a support film which has a satisfactory tear strength and sufficient porosity that its presence does not adversely affect the permeability of the coated membrane. However, the added cost of this expedient is highly undesirable.

It is also preferred that the microporous base film should have a Sheffield smoothness of at least 30. It is also preferred that the base film is composed of a material that can be heat-sealed.

Preferred polymers for polymeric matrix of the base film are (1) essentially linear ultrahigh molecular weight polyethylene having an intrinsic viscosity of at least 18, preferably 18 to 39, deciliters/gram, (2) essentially linear ultrahigh molecular weight polypropylene having an intrinsic viscosity of at least 6 deciliters/gram, and (3) mixtures of (1) and (2).

The preferred base film includes a finely divided, particulate, substantially water-insoluble, inorganic filler, for example a siliceous filler, which is distributed throughout the matrix and which is present in amount 50 to 90%, particularly 50 to 85%, by weight of the base film. The filler is preferably silica, particularly precipitated silica, especially silica having an average ultimate particle size of less than 0.1 micrometer. Preferably the filler occupies 35 to 80% of the total volume of microporous film. Particularly preferred, because they have a relatively narrow range of pore sizes, are films made a process comprising the steps of (A) preparing a uniform mixture comprising the polymeric matrix material in the form of a powder, the filler, and a processing oil;

(B) extruding the mixture as a continuous sheet;

(C) forwarding the continuous sheet, without drawing, to a pair of heated calender rolls;

(D) passing the continuous sheet through the calender rolls to form a sheet of lesser thickness;

(E) passing the sheet from step (D) to a first extraction zone in which to the processing oil is substantially removed by extraction with an organic extraction liquid which is a good solvent for the processing oil, a poor solvent for the polymeric matrix material, and more volatile than the processing oil;

(F) passing the sheet from step (E) to a second extraction zone in which the organic extraction liquid is substantially removed by steam or water or both; and (G) passing the sheet from step (F) through a forced air dryer to remove residual water and organic extraction liquid.

Such films are disclosed in U.S. Pat. Nos. 4,937,115 and 3,351,495, the disclosures of which are incorporated herein by reference, and are sold by PPG Industries under the tradename "Teslin".

The thickness of the base film is preferably 0.03 to 0.65 mm.

The microporous base film can be modified by calendering at a nip pressure of 17.8 to 266.6 kg per linear cm (100 to 1500 pli). We have found that calendering the base film results in coated films which have reduced OTR values and increased R values. The base film can be uniaxially or biaxially calendered. The base film can also be stretched, uniaxially or biaxially.

Coating Polymers

The coating polymer can be a single polymer or a mixture of two or more different polymers. Preferably the coating polymer is a crystalline polymer having a $T_p$ of −5 to +40° C., particularly −5 to 15° C., especially 0 to 15° C., e.g. 1° to 15° C., and a ΔH of at least 5 J/g, particularly at least 20 J/g. We have found that the higher the ΔH of the polymer, the higher its $P_{10}$ value over temperature ranges which include $T_p$. The $T_p$ and $T_o$ values of the polmer are preferably such that $T_p$–$T_o$ is less than 10° C., particularly 5 to 10° C. The polymer can be crosslinked after it has been applied, for example to reduce its tackiness.

Suitable polymers include those described in U.S. Pat. No. 5,254,354, the disclosure of which is incorporated herein by reference. Particularly preferred are side chain crystalline (SCC) polymers. SCC polymers can be prepared for example by copolymerizing (i) at least one n-alkyl or fluoroalkyl acrylate or methacrylate in which the alkyl group contains at least 12 carbon atoms, preferably one or more of docosanyl, octadecyl, hexadecyl, tetradecyl, and dodecyl acrylates, and (ii) one or more comonomers selected from acrylic acid, methacrylic acid, esters of acrylic or methacrylic acid in which the esterifying group contains less than 10 carbon atoms, e.g. hydroxyethyl butyl, hexyl, cyclohexyl, or 2-ethyl hexyl, and highly polar monomers such as polyethylene glycol acrylate or methacrylate. These SCC polymers generally have a high R ratio, e.g. greater than 5, except for those polymers which contain substantial amounts of fluoroalkyl and/or cycloalkyl groups.

Other polymers which can be used include acrylate polymers (including methacrylate polymers) which are not SCC polymers, e.g. acrylate polymers which are derived from one or more monomers as specified in (ii) above; fluoropolymers (the term "fluoropolymer" being used herein to denote a polymer in which the atomic ratio of fluorine to carbon is at least 1.5, preferably at least 2); cis-polybutadiene; poly(4-methylpentene); polydimethyl siloxanes; ethylene-propylene rubbers; and polyurethanes.

Coating Compositions

The coating polymer is preferably applied to the porous substrate as a coating composition which comprises the coating polymer dissolved in a suitable solvent, e.g. toluene, tetrahydrofuran, heptane or methyl ethyl ketone. After the composition has been applied, the solvent is removed by heating, leaving the polymer adherent to the substrate. The concentration of the coating polymer in the coating composition is preferably 2 to 12%, e.g. 5 to 10%, based on the weight of the composition. The coating composition can contain other ingredients in addition to the polymer and the solvent, for example a crosslinking agent which is activated after the solvent has been removed, e.g. aluminum acetyl acetonate or a polyfunctional aziridine such as the product available from Aldrich Chemicals under the tradename XAMA 7.

Application of the Coating Compositions

The coating can be carried out in any convenient way, for example by hand using a Meyer rod, or using commercially available coating equipment, e.g. gravure-coating equipment, which is preferred, or knife-over-roll equipment. A single coating is normally adequate, but a second coating of the same or a different coating composition can be applied after drying the first. Preferably the coating is carried out using a gravure coating roll having a theoretical cell volume of $31 \times 10^6$ to $232.5 \times 10^6$ cubic microns per $mm^2$ ($20 \times 10^9$ to $150 \times 10^9$ cubic microns per $inch^2$), preferably $62 \times 10^6$ to $124 \times 10^6$ cubic microns per $mm^2$ ($40 \times 10^9$ to $80 \times 10^9$ cubic microns per $inch^2$), or using equipment which provides a similar coating weight. The coating weight is preferably 1.7 to 2.9 $g/m^2$.

Properties of the Membranes

As discussed above, the properties of the membranes of the invention depend upon a number of factors, including the base film, the coating polymer, the coating composition, and the amount of coating composition applied to the base film. The membrane preferably has a $P_{10}$ ratio, over at least one 10° C. range between −5 and 15° C., preferably over at least one 10° C. range between 0° C. and 15° C., of at least 1.3, preferably at least 2, particularly at least 2.5, especially at least 2.6. The membrane preferably has an OTR of 775,000 to 7,750,000 (50,000 to 500,000), preferably 1,550,000 to 3,875,000 (100,000 to 25,000), particularly at least 2,325,000 (150,000). When the OTR is 775,000 to 3,100,000 (50,000 to 200,000), the R ratio of the membrane is preferably at least 2, particularly at least 2.5, especially at least 3; and when the OTR is 775,000 to 3,100,000 (50,000 to 200,000), the R ratio is preferably more than 3.8-0.00000045 P' (3.8-0.000007P), particularly up to 7.4-

0.00000116 P' (7.4-0.000018P), especially up to 5.6-0.0000084 P' (5.6-0.000013P), where P' is the OTR in ml/m$_2$.atm.24 hrs, and P is the OTR in cc/100 inch$_2$.atm 24 hrs. The membrane preferably also has these values for OTR and R when the OTR and COTR are measured at any temperature between 20° C. and 25° C. The membrane preferably has these values for OTR, $P_{10}$ and R both when the $O_2$ and $CO_2$ permeabilities are measured at 0.7 kg/cm$^2$ (10 psi) and when they are measured at 0.035 kg/cm$^2$ (0.5 psi).

If a membrane having a low R ratio is desired, one way of achieving this result is by using an acrylate coating polymer which contains a relatively large proportion of units derived from a cycloalkyl acrylate or methacrylate, e.g. at least 40%, preferably at least 45%, particularly 45 to 60%, and which is applied at a coating weight which results in an appropriate OTR. For example, a copolymer of n-hexyl acrylate and cyclohexylmethacrylate (CY6MA) containing 20–30% of CY6MA will generally give rise to a membrane having an R ratio of 4 to 6, while a similar polymer containing 50% CY6MA applied at a coating weight giving the same OTR will generally give rise to a membrane having an R ratio of 1.5 to 3.

Another way of obtaining a membrane with a low R ratio is to make use of a fluoropolymer coating polymer. For example, membranes obtained by coating a microporous film with a coating composition containing 4 to 7% of a fluoropolymer can exhibit an R ratio of 2 to 3. However, many fluoropolymers have such low permeability to oxygen that it is not practical to employ them to make membranes having a sufficiently high OTR, e.g. at least 1,500,000 (100,000), preferably at least 3,000,000 (200,000). A preferred fluoropolymer is a copolymer of tetrafluoroethylene and at least 40%, e.g. 40 to 70%, 2,2-bistrifluoromethyl-4,5-difluoro-1,3-dioxole.

Other polymers which can be used to prepare membranes with low R ratios include dimethyl siloxanes, methacryloxypropyl tris (trimethylsiloxy) silane, and acrylate polymers containing units derived from a fluoroalkyl acrylate or methacrylate, e.g. acrylate polymers containing units derived from hexafluoroisopropylmethacrylate and/or hydroxyethyl methacrylate.

Another way of making a membrane having a low R ratio is to use a substrate with fewer pores that allow gas flow. Such a substrate can be made by coating a relatively porous substrate with a material which blocks some of the pores with a polymer having a low R ratio, e.g. of less than 1.3, or with a particulate material which is deposited into the pores, e.g. carbon black, silica or talc. For example, as shown in Example 19, precoating Teslin SP7 with a suitable polymer reduces the R ratio of the membrane by 1 unit.

The use of a thicker porous substrate also generally results in a membrane of lower R ratio while maintaining a similar $P_{10}$ value.

If a membrane having a high R ratio is desired, one way of achieving this result is by using an acrylate polymer, e.g. an SCC acrylate polymer, containing a high proportion, e.g. 10 to 90%, preferably 20 to 60%, of a highly polar component, e.g. a polyethylene glycol acrylate or methacrylate. A preferred polymer of this type is a copolymer comprising 30–60% of units derived from tetradecyl acrylate, 10–20% of units derived from hexyl acrylate, and 20–60% of units derived from polyethylene glycol methacrylate. Homopolymers of highly polar acrylates, e.g. polyethylene glycol acrylate or methacrylate, can also be used to give membranes with high R values, but which do not have the high $P_{10}$ values of membranes containing SCC acrylate polymers.

Other coating polymers which can be used to prepare membranes with high R ratios include polyurethanes (e.g. that available under the tradename Bion II from Goldschmidt, Germany) and cellulose acetate.

The membrane can be covered by a covering layer, so that the polymeric coating is sandwiched between the microporous film and the covering layer, providing that the covering layer is sufficiently porous not to have an adverse effect on permeability. The covering layer is generally different from, but can be the same as, the base film. The cover layer can be melt-bonded to the coated film. However, the use of a covering layer adds to the cost of the product.

The properties of the membrane can be modified by calendering, uniaxially or biaxially, preferably at a nip pressure of 17.8 to 266.6 kg per linear cm (100 to 1500 pli). We have found that calendering reduces the OTR and increases the R ratio of the membrane.

Containers

The properties of the membranes are such that they can be used to control the atmosphere within a container whose walls are relatively impervious to gases except over one or more control sections, the control section, or at least one of the control sections if there are two or more, being provided by a membrane of the invention. In one embodiment, the control section is an aperture which lies in a gas-impervious wall of the container and which is covered by a membrane of the invention. The aperture can be, for example, 5 to 50% of the total wall area of the container. The container can be, for example, a bag of flexible polymeric material, e.g. a laminate of two different polymeric films. Preferably the uncoated side of the membrane is secured, e.g. heat-sealed, impulse-sealed, or radio frequency sealed, to the container, around the periphery of the aperture. For this purpose, the outer surface of the container is preferably composed of a material which can be heat-sealed to the base film. In a typical procedure, the membrane is heat-sealed to the enclosure using an impulse sealer at 115° C. for 0.4 secs.

The membranes of the invention are not in general as physically robust as the walls of the container. As a result, in many cases, the container is undesirably weakened by cutting into the wall of the container a single hole which has the same area as the desired area of the membrane (to achieve the desired permeability for the package as a whole). It is possible to use a plurality of smaller, separate holes, each covered by a separate membrane, the total area of the holes being equal to the desired area. But this is expensive and may make it difficult to place the holes at positions where physical stresses are less likely to occur. We have discovered that improved results can be achieved by cutting a plurality of flaps in the wall of the container, folding the flaps against the interior surface wall of the container, thus creating apertures, and securing the membrane to the interior surface of the wall of the container so that the membrane covers the apertures and the flaps. Generally, a single membrane will extend over all the flaps and all the apertures; however, two or more membranes can be used, each covering one or more apertures and flaps. We have found that in this way it is possible to create a package in which the effective area of the membrane is substantially larger than the sum of the areas of the apertures. This is apparently because the folded flaps prevent the membrane from making intimate contact with the wall of the container, thus permitting the exchange of gases over substantially all, or a large proportion, of the membrane. The area of the apertures in such a package is preferably 5 to 40%, particularly 10 to 20%, of the area of the membrane. A similar result could be achieved by using some other means, in addition to or instead of the interiorly folded flaps, to maintain separation between the membrane and the wall of the container. This discovery is particularly useful when using the novel membranes of the present invention, but is also useful in any package in which the permeability of the package is influenced or controlled by one or more control sections which are composed of a material different from the remainder of the package. All such packages making use of this discovery form part of the present invention.

In another embodiment, the membrane is in the form of a strip which runs down the length of the container, or which otherwise extends across a complete dimension of the container. This has the advantage that the strip can be incorporated into the sheet material from which the bag or other container is made, so that it is not necessary to add individual patches to each container. Another advantage is that the strip is less likely to interfere with graphical design on the container.

The size of the containers can vary considerably. In one category, the container contains up to 2.26 kg (5 lb) of produce. In another category, the containers are much larger, e.g. containing up to 1500 lb (680 kg) of produce.

A wide range of respiring biological materials can be packaged in containers of the invention, including broccoli, cut lettuce, cauliflower, mushrooms, asparagus, and strawberries.

EXAMPLES

The invention is illustrated in the following Examples, a number of which are comparative Examples. In the Examples, the coating polymers used are often referred to by the following abbreviations.

SCC 1–15 and ACP. These acrylate polymers were prepared by polymerizing the monomers and parts by weight thereof shown in Table 1. In Table 1, the following abbreviations are used for the monomers. AA is acrylic acid, MAA is methacrylic acid, EHA is 2-ethylhexyl acrylate, C4A is butyl acrylate, C6A is hexyl acrylate, CY6MA is cyclohexylmethacrylate, C6DA is hexyldiacrylate, C12A is dodecyl acrylate, C12DA is dodecyl diacrylate, C14A is tetradecyl acrylate, C16A is hexadecyl acrylate, and C22A is behenyl acrylate. The monomers were copolymerized in a suitable solvent, e.g. toluene or a mixture of heptane and butyl acetate or ethyl acetate, using a suitable initiator, e.g. azobisisobutyronitrile (AIBN). For example, SCC11 was made by mixing the C6A and C14A with 0.31 parts of AIBN in a 4:1 mixture of heptane and ethyl acetate, and maintaining the mixture at 50° C. for 2 days, to give a product having a weight average molecular weight of about 970,000 and a $T_p$ of about 1 2.5° C. SCC 5 was made by polymerizing the C22A alone, functionalizing the resulting homopolymer with isocyanatoethylmethyl methacrylate, and then polymerizing the other monomers with the functionalized homopolymer.

CisPB is cis-polybutadiene available from Aldrich Chemical Co. Tflex is an aliphatic polyurethane available under the tradename Tecoflex SG80A from Thermedics Corp. Sil is a moisture-curable, RTV (room-temperature vulcanizable) polydimethyl siloxane available under the tradename Silastic 734 from Dow Corning Corporation. Kton is a styrene-ethylene-butylene block copolymer available under the trade name Kraton from Shell Chemical Co. TPX is poly-(4-methyl pentene) available under the tradename TPX from Aldrich Chemicals. Teflon AF is a copolymer of tetrafluoroethylene and 2,2-bistrifluoromethyl-4,5-difluoro-1,3-dioxole available under the tradename Teflon AF 1600 from du Pont. PLV2000 is a solvent-coatable copolymer of hexafluoropropylene, tetrafluoroethylene and vinylidene fluoride which is available under the tradename Pelmor PLV 2000 from du Pont and which has an R ratio of about 1. MPEG is polyethylene glycol methacrylate available under the tradename MPEG 350MA from International Specialty Chemicals.

These polymers were used in coating solutions of various concentrations. The SCC and ACP polymers were prepared in solution and were diluted to the desired concentration by addition of a suitable solvent, e.g. heptane. The CisPB, the mixtures of CisPB and SCC8, and the Sil polymers were dissolved in toluene; the Tflex polymers were dissolved in tetahydrofuran; the Kraton polymers were dissolved in toluene; and the PTFE polymers were dissolved in a perfluorosolvent which is available under the tradename Fluorinert FC-75 from 3M.

The substrates used in the Examples are often referred to by the following abbreviations. CG is a porous polyethylene film having a porosity of about 55% and a pore size of about 0.25 microns, available under the tradename Celgard K878 from Hoechst Celanese Corp. MSX is a porous polyethylene film available under the tradename MSX 1137P from 3M Co. Van L is a filled porous polyethylene film available under the tradename Van Leer 10X from Van Leer Corp. Teslin SP7 is a filled porous polyethylene films containing about 60% silica, having a thickness of about 0.18 mm (0.007 inch), a tear strength measured as described above of about 90 g, a porosity of about 65%, an average pore size of about 0.1 micron and a largest pore size of 4–10 microns. Teslin X457 is similar to Teslin SP7 but is more porous. Teslin SP10 is similar to Teslin SP7 but has a thickness of about 0.25 mm (0.010 inch). All three Teslins are available under the tradename Teslin from PPG Industries. When tested by mercury porosimetry, the distribution of pore sizes in Teslin SP7 was as follows.

TABLE 1

| | AA | MAA | EHA | C4A | C6A | C6DA | C12A | C12DA | C14A | C16A | C22A |
|---|---|---|---|---|---|---|---|---|---|---|---|
| SCC1 | 5 | — | — | — | — | — | 47.5 | — | — | 47.5 | — |
| SCC2 | 5 | — | — | — | — | — | 65 | — | — | 30 | — |
| SCC3 | — | 5 | — | — | — | — | 47.5 | — | 47.5 | — | — |
| SCC4 | 5 | — | — | — | — | — | 60 | — | — | 35 | — |
| SCC5 | 3 | — | — | — | — | — | 20 | — | 60 | — | 20 |
| SCC6 | — | — | — | — | — | — | 65 | 0.25 | — | 35 | — |
| SCC7 | 1 | — | — | — | — | — | 64 | 0.1 | — | 35 | — |
| SCC8 | — | — | — | — | — | — | — | — | 100 | — | — |
| SCC9 | — | 5 | — | — | — | — | 47.5 | — | 47.5 | — | — |
| SCC10 | 3 | — | — | — | — | — | — | — | 57 | 40 | — |
| SCC11 | — | — | — | — | 15 | — | — | — | 85 | — | — |
| SCC12 | — | 5 | — | — | 15 | — | — | — | 80 | — | — |
| SCC13 | 3 | — | — | — | 42 | — | — | — | 55 | — | — |
| SCC14 | — | — | — | — | 15 | — | — | — | 85 | — | — |
| SCC15 | — | — | — | — | — | — | — | — | 100 | — | — |
| ACP | 6 | — | 47 | 47 | — | — | — | — | — | — | — |

| Pore Size (microns) | .013 | .016 | .026 | .044 | .058 | .08 | .11 | .15 | .24 | .36 | .6 |
|---|---|---|---|---|---|---|---|---|---|---|---|
| % of pores larger than pore size | 90% | 80% | 70% | 60% | 50% | 40% | 30% | 20% | 10% | 5% | 2% |

AKZ0 is a porous polypropylene film in which the pores have a size of 0.1 to 0.29 micron, available under the tradename Akzo 1EPP from Enka AG. Delnet is a perforated high density polyethylene film, 0.11 mm (4.5 mil) thick, with an open area of about 36%, available under the tradename Delnet from Applied Extrusion Technologies. BF 915, Roplast, LB710 and CVP are commercially available laminate packing films in which one layer is polyethylene, available from Barrier, Roplast, Golden Eagle and CVP respectively.

Except where otherwise noted, the procedure used to coat the substrates was to apply the coating solution with a #30 Meyer rod, and to dry the coating in ambient air for 15 minutes and then at 83° C. for 30 minutes.

Examples 1–10 and C1–4

Examples 1–10 and C1–4 are summarized in Tables 2–4 below. In each of the tests, the substrate identified in Table 2 was coated with a solution containing the identified percentage of the identified coating polymer. The coated substrate was dried, and its permeability to $O_2$ and $CO_2$ was measured at the temperature indicated in Table 2. The results are reported in Table 2. In some cases, the $P_{10}$ ratios were calculated, as shown in Tables 3 and 4.

Figure 1:
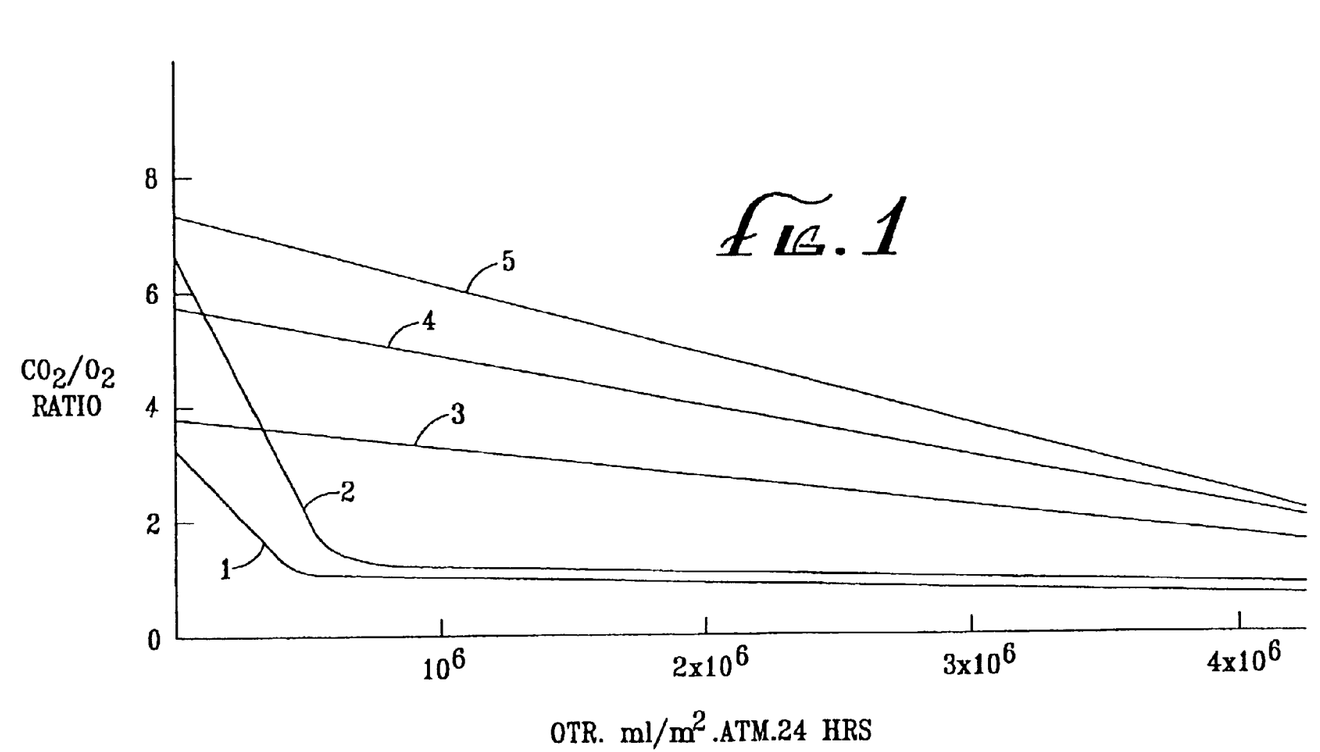

The OTR and R values of some of the Examples are shown graphically in FIG. 1 of the accompanying drawings. In FIG. 1, curve 1 represents comparative Examples 1K to 1N (SCC 1 on Van Leer), curve 2 represents comparative Examples 1H–J (SCC1 on MSX), curve 3 represents Examples 2O–Q (TPX on Teslin SP7), curve 4 represents Examples 1P, Q and R (SCC1 on Teslin SP7), and curve 5 represents Examples 2H to 2K (cis PB+SCC8 on Teslin SP7).

TABLE 2

| Ex No. | Substrate | Coating Polymer Type | % | Permeability OTR | Ratio $CO_2/O_2$ | ° C. |
|---|---|---|---|---|---|---|
| *1A | CG | SCC1 | 2 | ** | 1.0 | 20 |
| *B | | | 5 | ** | 1.0 | 20 |
| *C | | | 10 | ** | 1.0 | 20 |
| *D | | | 20 | ** | 1.0 | 20 |
| *E | MSX | SCC1 | 2 | ** | 1.0 | 20 |
| *F | | | 5 | ** | 1.0 | 20 |
| *G | | | 10 | ** | 1.0 | 20 |
| *H | | | 20 | 487,475 (31,450) | 1.86 | 20 |
| *I | | | 25 | 63,689 (4,109) | 5.75 | 20 |
| *J | | | 30 | 44,175 (2,850) | 6.5 | 20 |
| *K | Van L | SCC1 | 2 | 403,077 (26,005) | 1.32 | 20 |
| *L | | | 5 | 29,636 (1,912) | 3.92 | 20 |
| *M | | | 10 | 62,558 (4,036) | 2.39 | 20 |
| *N | | | 20 | 62,310 (4,020) | 2.42 | 20 |
| O | Teslin SP7 | SCC1 | 2 | 2,413,458 (155,707) | 2.95 | 20 |
| P | | | 5 | 1,021,140 (65,880) | 4.86 | 20 |
| Q | | | 10 | 602,547 (38,874) | 5.22 | 20 |
| R | | | 20 | 425,025 (27,421) | 5.48 | 20 |
| 2A | Teslin SP7 | Tflex | 5 | 1,076,537 (69,454) | 2.34 | 20 |
| *B | | | 7 | 238,024 (15,368) | 5.9 | 20 |
| *C | | | 15 | 108,856 (7,023) | 6.19 | 20 |
| D | Teslin SP7 | Sil | 35 | 1,607,799 (103,729) | 2.98 | 20 |
| E | | | 40 | 987,319 (63,698) | 4.13 | 20 |
| F | | | 50 | 809,627 (52,234) | 4.7 | 20 |
| *G | | | 100 | 391,824 (25,279) | 5.3 | 20 |
| H | Teslin SP7 | CisPB | 2 | 3,712,994 (239,548) | 2.8 | 20 |
| I | | | 5 | 2,451,728 (158,176) | 4.39 | 20 |
| J | | | 10 | 888,987 (57,354) | 6.45 | 20 |
| *K | | | 20 | 392,925 (25,350) | 7.2 | 20 |
| *L | Teslin SP7 | Kton | 5 | 293,570 (18,940) | 4.4 | 20 |
| *M | | | 10 | 116,606 (7,523) | 4.7 | 20 |
| *N | | | 20 | 46,887 (3,025) | 5.0 | 20 |
| O | Teslin SP7 | TPX | 5 | 974,841 (62,893) | 3.35 | 20 |
| P | | | 5 | 923,598 (59,587) | 3.3 | 20 |
| Q | | | 2 | 2,798,478 (180,547) | 2.38 | 20 |
| 3A | Teslin SP7 | SCC2 | 10 | 637,592 (41,135) | 4.94 | 20 |
| B | | SCC3 | 5 | 927,861 (59,862) | 4.81 | 20 |
| *C | | ACP | 5 | 403,728 (26,047) | 5.8 | 20 |
| D | | CisPB | 5 | 2,092,934 (135,028) | 4.8 | 20 |

*comparative example
**permeability too high to measure

TABLE 2-continued

| Ex No. | Substrate | Coating Polymer Type | % | Permeability OTR | Ratio CO$_2$/O$_2$ | ° C. |
|---|---|---|---|---|---|---|
| E | | *CisPB + SCC8 | 5 | 1,205,559 (77,778) | 5.3 | 20 |
| F | | SCC4 | 2 | 1,883,389 (121,509) | 3.3 | 20 |
| *G | | SCC4 | 10 | 687,688 (44,367) | 5.2 | 20 |
| H | | SCC5 | — | 930,854 (60,055) | 4.72 | 20 |
| I | | SCC6 | 10 | 812,959 (52,449) | 5.10 | 20 |
| *J | | SCC7 | 25 | 410,440 (26,480) | 5.23 | 20 |
| 4A | Teslin SP7 | CisPB | 5 | 125,218 (80,786) | 6.50 | 0 |
| B | | CisPB | 5 | 1,367,875 (88,250) | 6.09 | 5 |
| C | | CisPB | 5 | 1,579,000 (101,871) | 5.51 | 10 |
| D | | CisPB | 5 | 1,839,323 (118,666) | 5.43 | 15 |
| E | | CisPB | 5 | 2,092,934 (135,028) | 4.82 | 20 |
| F | | CisPB | 5 | 2,328,952 (150,255) | 4.55 | 25 |
| *G | | *CiSPB + SCC8 | 5 | 320,617 (20,685) | 5.5 | 0 |
| *H | | *CisPB + SCC8 | 5 | 394,304 (25,439) | 5.5 | 5 |
| *I | | *CisPB + SCC8 | 5 | 512,848 (33,087) | 5.4 | 10 |
| *J | | *CisPB + SCC8 | 5 | 722,455 (46,610) | 5.3 | 15 |
| K | | *CisPB + SCC8 | 5 | 1,205,559 (77,778) | 5.3 | 20 |
| L | | *CisPB + SCC8 | 5 | 1,520,379 (98,089) | 5.2 | 25 |
| M | | SCC10 | 5 | 1,020,628 (65,847) | 5.93 | 22.2 |
| *5A | Teslin SP7 | SCC11 | 6.5 | †386,461 (24,933) | 6.06 | 0 |
| *B | | | 6.5 | †521,141 (33,622) | 6.16 | 5 |
| C | | | 6.5 | †1,048,590 (67,651) | 6.12 | 10 |
| D | | | 6.5 | †1,474,933 (95,157) | 5.78 | 15 |
| E | | | 6.5 | †1,825,001 (117,742) | 5.53 | 20 |
| F | | | 6.5 | †2,225,753 (143,597) | 5.21 | 25 |
| G | | | 6.5 | †2,587,33 (166,926) | 4.88 | 30 |
| 6 | Teslin SP7 | SCC12 | 6.5 | †1,286,500 (83,000) | 5.29 | 22 |
| 7A | Teslin X457 | SCC13 | 2 | †4,022,699 (259,529) | 3.92 | 22 |
| B | | | 1.5 | †8,789,414 (567,059) | 2.62 | 22 |
| C | | | 1.3 | †13160,662 (849,075) | 1.68 | 22 |
| 7D | Teslin SP7 | SCC13 | 1 | †8,693,239 (560,854) | 2.75 | 22 |
| E | | | 1.5 | †3,262,486 (210,483) | 4.88 | 22 |
| F | | | 2 | †2,766,083 (178,547) | 5.48 | 22 |
| G | | | 3 | †1,869,005 (120,581) | 6.03 | 22 |
| 8 | Teslin SP7 | SCC13 | 3 | †1,518,643 (97,977) | 6.32 | 22 |
| 9 | | SCC15 | 6.5 | †1,758,196 (113,432) | 5.58 | 22 |
| 10 | | SCC16 | 3.8 | †1,113,241 (71,822) | 7.06 | 22 |
| *C1 | Roplast | None | — | †3,859 (249) | | 22 |
| *C2 | BF915 | None | — | †4,836 (312) | | 22 |
| *C3 | LB710 | None | — | †5,161 (333) | | 22 |
| *and C4 | CVP | None | — | †5,130 (331) | | 22 |

*a mixture of CisPB (80 parts) and SCC8 (20 parts)
†OTR and COTR were measured at a pressure of 0.035 kg/cm$^2$ (0.5 psi) in Examples 5–10 and C1–C4.

TABLE 3

| Ex No | 3A | 3B | 3C* | 3D | 3E | 3F | 3G* | 3H | 3I | 3J* |
|---|---|---|---|---|---|---|---|---|---|---|
| P$_{10}$ (0–10° C.) | 2.79 | 2.00 | 1.31 | 1.26 | 1.60 | 2.41 | 3.13 | — | 4.72 | 4.33 |
| P$_{10}$ (20–30° C.) | — | — | — | 1.34 | 2.35 | — | — | 2.73 | — | — |

TABLE 4

| Ex No | 4A | *4G | 5A | 8 | 9 | 10 | 11 | *C1 | *C2 | *C3 | *C4 |
|---|---|---|---|---|---|---|---|---|---|---|---|
| P$_{10}$ (0–10° C.) | 1.26 | 1.6 | †2.71 | †1.4 | †2.4 | †2.8 | †3.5 | †1.54 | †1.82 | †1.74 | †1.79 |
| P$_{10}$ (10–20° C.) | 1.33 | 2.35 | — | — | — | — | — | — | — | — | — |

†OTR's in Examples 5A, 8–10 and C1–C4 were measured at a pressure of 0.035 kg/cm$^2$ (0.5 psi).

Example 11

A membrane was produced by coating SCC 10 at 8% concentration onto Teslin SP7. The resulting product was tacky to the touch. Second and third membranes were produced in the same way except that a crosslinking agent was added to the coating solution. The crosslinking agent was aluminum acetylacetonate (5%, based on polymer) or a polyfunctional aziridene (5%, based on polymer, available under the trade name XAMA 7 from Virginia Chemicals). The resulting products were much less tacky.

Example 12

This example illustrates the effect of calendering the coated microporous film. The OTR and R values and the thicknesses of a coated microporous film made by coating SCC1 onto Teslin SP7 were measured before calendering, after uniaxial calendering at 142 kg/linear cm (800 pli) or after uniaxial calendering at 269 kg/linear cm (1500 pli). The results are shown in Table 5 below.

TABLE 5

| Nip Pressure kg/lin. cm (pli) | Thickness mm (mils) | OTR | R |
| --- | --- | --- | --- |
| 0 | 0.17 (6.9) | 1,973,010 (127,291) | 3.82 |
| 142 (800) | 0.16 (6.3) | 1,742,138 (112396) | 4.09 |
| 169 (1500) | 0.157 (6.2) | 1,485,473.5 (95837) | 4.64 |

Example 13 is summarized in Table 6. Fresh broccoli was sealed into storage bags (23×28 cm) and stored for 13 days at 45° F., or for 9 days at 45° F. and 4 days at 55° F. Four control bags (C5–C8) were composed entirely of polyethylene. The other four bags (13A–13D) were bags of the invention and were identical to the control bags except that a hole of 4.76 cm diameter was cut in the polyethylene and sealed by means of a membrane which had an $O_2$ permeability of 1,224,500 (79,000) and which had been prepared by coating Teslin $SP_7$ with the SCC10 polymer. At the end of the storage period, the $O_2$ and $CO_2$ concentrations in the bag were measured. The results are shown in Table 5. The broccoli was then cooked for 1 minute in a microwave oven at the "high" setting. The broccoli from all the control bags had a strong and offensive odor and flavor before and after cooking. The broccoli from all the bags of the invention had no unpleasant odor or flavor before or after cooking; the broccoli stored at 45° F. for all 13 days was in better condition than that stored at 45° F. and 55° F.

TABLE 6

| | Storage | | After Storage | |
| --- | --- | --- | --- | --- |
| | Days at 45° F. | Days at 55° F. | % $CO_2$ | % $O_2$ |
| C5 | 13 | 0 | 8.3 | 0.29 |
| C6 | 13 | 0 | 8.0 | 0.79 |
| C7 | 9 | 4 | 9.1 | 0.46 |
| C8 | 9 | 4 | 8.5 | 0.32 |
| 13A | 13 | 0 | 4.1 | 2.89 |
| 13B | 13 | 0 | 4.8 | 10.9 |
| 13C | 9 | 4 | 4.1 | 1.04 |
| 13D | 9 | 4 | 4.3 | 1.00 |

Example 14

The following samples were used in this example.
Sample 14A Teslin SP7 which has been coated with a 10% solution of SCC4.
Sample 14B. A laminate of Sample 14A and Teslin SP7 laminated to the coated face of Sample 6A at about 50° C., applying pressure by means of a 8.85 kg (4 lb) roller.
Sample 14C Teslin SP7 which has been coated with a 1% solution of SCC13.
Sample 14D A laminate of Sample 14A and AKZO laminated to the coated face of Sample 14A in the same way as for Sample 14B.

The OTR's of samples 14A–D and 7B were measured (1) initially and (2) after folding four times (i.e. to 0.125 of original size) and unfolding. The results are shown in Table 7.

TABLE 7

| OTR | 14A | 14B | 14C | 14D | 7B |
| --- | --- | --- | --- | --- | --- |
| Initial | 687,735 (44,370) | 871,286 (56,212) | †8,693,237 (560,854) | 1,277,711 (82,433) | †8,789,414 (567,059) |
| After folding | ** | 852,500 (55,000) | †10,081,122 (650,395) | 1,282,857 (82,765) | †9,872,291 (636,922) |

**too permeable to measure
†OTR's were measured at 0.035 kg/cm² (0.5 psi) in Examples 14C and 7B

Example 15

A sample of AKZO film was heat-welded to Sample 14C. The heat weld was produced by an impulse sealer available from Packaging Aids Inc. under the trade name Sealmaster 420. The force needed to break the resulting bond was more than the tear strength of the AKZO film.

Example 16

The following samples were used in this Example.

Sample 16A Teslin SP7 which had been coated with a 5% solution of SCC4.
Sample 16B A laminate of Sample 16 A and Teslin SP7, the Teslin being laminated to the coated face of Sample 16A under heat and pressure.
Sample 16C A laminate of Sample 16A and Delnet, the Delnet being laminated to the coated face of Sample 16A under heat and pressure.

The $O_2$ permeabilities of samples 16B and 16C were measured initially, after folding as in Example 14, and after immersion in tap water for 10 minutes, followed by drying with a paper towel. The results are shown in Table 8.

TABLE 8

| | OTR | | |
| --- | --- | --- | --- |
| | Initial | After Folding | After Immersion |
| 16B | †871,286 (56,212) | †852,500 (55,000) | †479,213 (30,917) |
| 16C | †522,319 (33,698) | †489,009 (31,549) | †489,009 (31,549) |

†OTR's in Examples 16B and 16C were measured at 0.035 kg/cm² (0.5 psi)

In Examples 17–21 below, the OTR and COTR values were measured at a pressure of 0.035 kg/cm² (10.5 psi).

Example 17

A 4%, 5% or 7% Teflon AF solution was coated onto Teslin SP7. The OTR and R values of the resulting membranes are shown in Table 9 below.

TABLE 9

| | Coating Polymer | | | |
|---|---|---|---|---|
| Example No. | Type | % | OTR | R |
| 17A | Teflon AF | 7 | 5,115,728 (330,037) | 2.81 |
| 17B | Teflon AF | 5 | 7,351,123 (474,266) | 2.57 |
| 17C | Teflon AF | 4 | 10,604,976 (684,192) | 2.27 |

Example 18

CY6MA (50 part), C6A (50 part), AIBN (0.3 part) and butyl acetate (200 part) were mixed and degassed under nitrogen at room temperature for 1 hour. The mixture was heated at 50° C. for 24 hours. Additional AIBN (0.15 part) was added, and the mixture heated at 70° C. for 8 hours. Copolymers of C14A, C6A, and CY6MA in ratios of 40/40/20 and 40/30/30 were made similarly.

Figure 2:
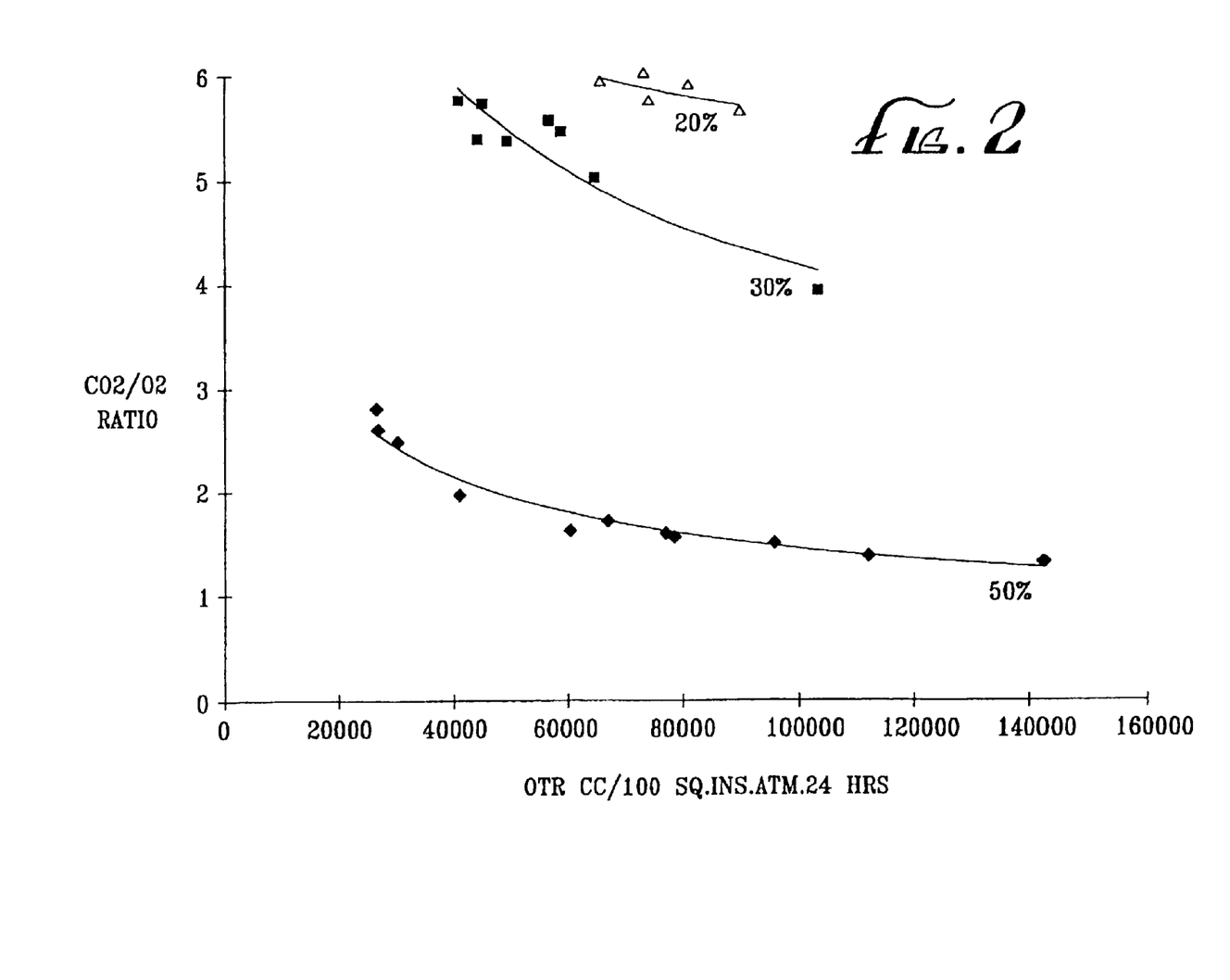

Solutions of the three copolymers in toluene or ethyl acetate at various concentrations were machine coated onto Teslin SP7. The OTR and R values of the resulting membranes are shown in FIG. 2.

Example 19

Solutions of SCC 12 (C14A/C6A/MA, 80/15/5) in methyl ethyl ketone, 3% or 5%, were coated onto (a) Teslin SP7 or (b) Teslin SP7 whose pores had been partially blocked by coating with a solution PLV 2000 (30% in methyl ethyl ketone) followed by drying at 82° C. for 2 mins. The solutions and substrates used, and the OTR and R values of the resulting membranes are shown in Table 10 below.

TABLE 10

| | Coating Polymer(s) | | | |
|---|---|---|---|---|
| Example No. | Type | % | OTR | R |
| 19A | SCC12 | 5 | 1,430,526 (92,292) | 5.42 |
| 19B | PLV2000 | 30 | 1,488,264 (96,017) | 1.02 |
| 19C | (1) PLV2000 | 30 | | |
| | (2) SCC12 | 5 | 398,707 (25,723) | 4.51 |
| 19D | SCC12 | 3 | 7,343,900 (473,800) | 2.57 |
| 19E | (1) PLV2000 | 30 | | |
| | (2) SCC12 | 5 | 950,615 (61,330) | 1.49 |

Example 20

Solutions in heptane of SCC 13 (C14A/C6A/AA, 55/42/3) at various concentrations were coated onto Teslin SP7 and Teslin SP10. The substrates used, and the OTR and R value of the resulting membranes, are shown in Table 11 below.

TABLE 11

| | Substrate | | |
|---|---|---|---|
| Example No. | Teslin | OTR | R |
| 20A | SP7 | 1,900,750 (122,629) | 4.89 |
| 20B | SP7 | 1,325,514 (85,517) | 5.88 |
| 20C | SP7 | 1,131,640 (73,009) | 5.94 |
| 20D | SP10 | 612,715 (39,530) | 4.94 |
| 20E | SP10 | 1,662,143 (107,235) | 3.45 |
| 20F | SP10 | 890,630 (57,460) | 4.49 |
| 20G | SP10 | 2,629,219 (169,627) | 2.49 |

The OTR of Membrane 20F was also measured at 0°, 5°, 10°, 15° and 25° C. The $P_{10}$ value was 1.74.

Example 21

Figure 3:
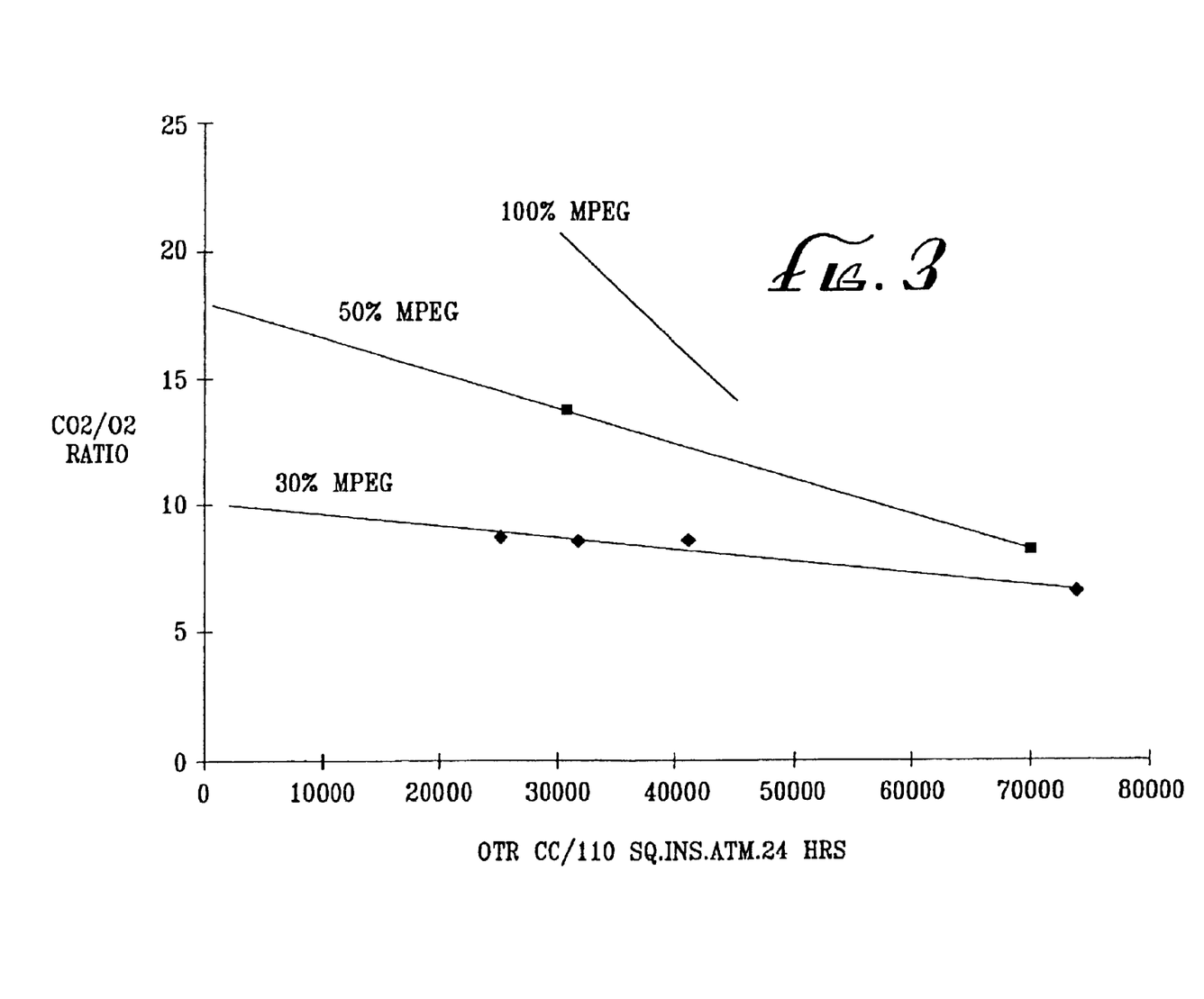

A copolymer containing 30% MPEG was made as follows. C14A (50 g), C6A (17 g), AA (3 g), MPEG (30 g), AIBN (0.25 g), heptane (140 g) and butyl acetate (60 g) were mixed in a 500 ml vessel. After sparging with nitrogen for 15 minutes, the mixture was heated at 45° C. for 3 days. A second polymer was made similarly from C6A (47 g), AA (3 g) and MPEG (50 g). A third polymer was made by homopolymerizing MPEG. Solutions of the three polymers in heptane at various concentrations were machine coated onto Teslin SP7. The polymers used, the concentrations of them in the coating solutions, and the OTR and R values of the resulting membranes are shown in Table 12 below and in FIG. 3.

TABLE 12

| | Coating Polymer | | | |
|---|---|---|---|---|
| Example. No. | % MPEG | % | OTR | R |
| 21A | 30 | 3.6 | 636,104 (41,039) | 8.39 |
| 21B | 30 | 5.2 | 489,319 (31,569) | 8.42 |
| 21C | 30 | 7.2 | 386,833 (24,957) | 8.64 |
| 21D | | 5.0 | 473,184 (30,528) | 13.62 |
| 21E | | 3.0 | 1,078,753 (69,597) | 8.19 |
| 21F | | 4.5 | 616,946 (39,803) | 16.26 |
| 21G | | 3.2 | 543,600 (35,071) | 18.4 |

What is claimed is:

1. A gas-permeable membrane which is useful in the packaging of respiring biological materials and which comprises:
   (a) a microporous polymeric film comprising a network of interconnected pores such that gases can pass through the film, and
   (b) a polymeric coating on the microporous film, wherein
   (1) the pores in the microporous film have an average pore size of less than 0.24 micron; and
   (2) the microporous film was prepared by a process comprising the steps of
      (A) preparing a uniform mixture comprising a polymeric matrix material in the form of a powder, a finely divided, particulate, substantially water-insoluble filler, and a processing oil;
      (B) extruding the mixture as a continuous sheet;
      (C) forwarding the continuous sheet, without drawing, to a pair of heated calender rolls;
      (D) passing the continuous sheet through the calender rolls to form a sheet of lesser thickness;
      (E) passing the sheet from step (D) to a first extraction zone in which the processing oil is substantially removed by extraction with an organic extraction liquid which is a good solvent for the processing oil, a poor solvent for the polymeric matrix material, and more volatile than the processing oil;
      (F) passing the sheet from step (E) to a second extraction zone in which the organic extraction liquid is substantially removed by steam or water or both; and
      (G) passing the sheet from step (F) through a forced air dryer to remove residual water and organic extraction liquid; and
   (3) the polymeric coating has a thickness such that the membrane;
      (i) has a $P_{10}$ ratio, over at least one 10° C. range between −5 and 15° C., of at least 1.3;
      (ii) has an oxygen permeability (OTR), at all temperatures between 20 and 25° C., of at least 775,000 ml/m².atm.24 hrs (50,000 cc/100 inch².atm.24 hrs; and
      (iii) has a $CO_2/O_2$ permeability ratio(R) of at least 1.5;

the $P_{10}$, OTR and R values being measured at a pressure of 0.035 kg/cm² (0.5 psi).

2. A membrane according to claim 1 wherein the polymeric matrix material is selected from the group consisting of:
(i) an essentially linear ultrahigh molecular weight polyethylene having an intrinsic viscosity of at least 18 deciliters/g and
(ii) an essentially linear ultrahigh molecular weight polypropylene having an intrinsic viscosity of at least 6 deciliters/g.

3. A membrane according to claim 1 wherein at least 70% of the pores in the microporous film have a pore size of less than 0.24 micron;
(1) at least 70% of the pores in the microporous film have a pore size less than 0.24 micron;
(2) less than 20% of the pores in the microporous film have a pore size less than 0.014 micron; and
(3) at least 80% of the pores in the microporous film hav a pore size less than 0.15 micron.

4. A membrane according to claim 1 wherein at least 90% of the pores in the microporous film have a pore size of less than 0.24 micron.

5. A membrane according to claim 1 wherein substantially 100% of the pores in the microporous film have a pore size of less than 0.24 micron.

6. A membrane according to claim 1 wherein at least 80% of the pores in the microporous film have a pore size less than 0.15 micron.

7. A membrane according to claim 1 which has an OTR of at least 1,550,000 ml/m².atm.24 hrs (100,000 cc/inch².atm.24 hrs), and an R ratio of at least 2, the OTR and R values being measured at a pressure of 0.7 kg/cm² (10 psi).

8. A membrane according to claim 7 which has an OTR of at least 2,325,000 ml/m².atm.24 hrs (150,000 cc/100 inch².atm.24 hrs) measured at a pressure of 0.7 kg/cm² (10 psi).

9. A membrane according to claim 1 wherein the coating polymer has been crosslinked.

10. A membrane according to claim 1 wherein the microporous polymeric film contains pores which are partially blocked by a polymer having a R ratio of less than 1.3 or by a particulate material.

11. A package which is stored in air and which comprises
(a) a sealed container, and
(b) within the sealed container, a respiring biological material and a packaging atmosphere around the biological material; the sealed container including one or more permeable control sections which provide at least the principal pathway for oxygen and carbon dioxide to enter or leave the packaging atmosphere, at least one said permeable control section being a gas-permeable membrane as defined in claim 1.

12. A gas-permeable membrane which is useful in the packaging of respiring biological materials and which comprises:
(a) a microporous polymeric film comprising a network of interconnected pores such that gases can pass through the film, and
(b) a polymeric coating on the microporous film, wherein
(1) the pores in the microporous film have an average pore size of less than 0.24 micron;
(2) at least 70% of the pores in the microporous film have a pore size of less than 0.24 micron;
(3) less than 20% of the pores in the microporous film have a pore size less than 0.014 micron;
(4) at least 80% of the pores in the microporous film have a pore size less than 0.15 micron; and
(5) the polymeric coating has a thickness such that the membrane;
(i) has a $P_{10}$ ratio, over at least one 10° C. range between −5 and 15° C., of at least 1.3;
(ii) has an oxygen permeability (OTR), at all temperatures between 20° and 25° C., of at least 775,000 ml/m².atm.24 hrs (50,000 cc/100 inch².atm.24 hrs; and
(iii) has a $CO_2/O_2$ permeability ratio(R) of at least 1.5;
the $P_{10}$, OTR and R values being measured at a pressure of 0.035 kg/cm² (0.5 psi).

13. A membrane according to claim 12 wherein at least 80% of the pores in the microporous film have a pore size less than 0.15 micron and at least 70% of the pores in the microporous film have a pore size less than 0.11 micron.

14. A membrane according to claim 12 which has an OTR at all temperatures between 20° C. and 25° C. of at least 1,550,000 ml/m².atm.24 hrs (100,000 cc/inch².atm.24 hrs) and an R ratio of at least 2.5, the OTR and R values being measured at a pressure of 0.035 kg/cm² (0.5 psi).

15. A membrane according to claim 12 which has an OTR of at least 2,325,000 ml/m².atm.24 hrs (150,000 cc/100 inch².atm.24 hrs) measured at a pressure of 0.07 kg/cm² (10 psi).

16. A membrane according to claim 12 wherein the coating polymer has been crosslinked.

17. A package which is stored in air and which comprises:
(a) a sealed container, and
(b) within the sealed container, a respiring biological material and a packaging
atmosphere around the biological material;
the sealed container including one or more permeable control sections which provide at least the principal pathway for oxygen and carbon dioxide to enter or leave the packaging atmosphere, at least one said permeable control section being a gas-permeable membrane which comprises
(a) a microporous polymeric film comprising a network of interconnected pores such that gases can pass through the film, and
(b) a polymeric coating on the microporous film, wherein
(1) the pores in the microporous film have an average pore size of less than 0.24 micron;
(2) at least 70% of the pores in the microporous film have a pore size of less than 0.24 micron;
(3) less than 20% of the pores in the microporous film have a pore size less than 0.014 micron;
(4) at least 80% of the pores in the microporous film have a pore size less than 0.15 micron; and
(5) the polymeric coating has a thickness such that the membrane
(i) has a $P_{10}$ ratio, over at least one 10° C. range between -5 and 15° C. of at least 1.3;
(ii) has an oxygen permeability (OTR), at all temperatures between 20 °and 25° C., of at least 775,000 ml/m² .atm.24 hrs (50,000 cc/100 inch².atm.24 hrs; and
(iii) has a $CO_2/O_2$ permeability ratio (R) of at least 1.5;
the $P_{10}$, OTR and R values being measured at a pressure of 0.035 kg/cm² (0.5 ) psi.

18. A membrane according to claim 1 wherein the filler is a siliceous filler.

19. A membrane according to claim 12 wherein the filler is a siliceous filler.

20. A membrane according to claim 19 wherein the polymeric matrix is composed of polyethylene and the distribution of pore sizes in the microporous film is as set out in the following table

| Pore Size (microns) | .013 | .016 | .026 | .044 | .058 | .08 | .11 | .15 | .24 | .36 | .6 |
|---|---|---|---|---|---|---|---|---|---|---|---|
| % of pores larger than pore size. | 90% | 80% | 70% | 60% | 50% | 40% | 30% | 20% | 10% | 5% | 2% |

21. A membrane according to claim 18 wherein the polymeric matrix is composed of polyethylene and the distribution of pore sizes in the microporous film is as set out in the following table

| Pore Size (microns) | .013 | .016 | .026 | .044 | .058 | .08 | .11 | .15 | .24 | .36 | .6 |
|---|---|---|---|---|---|---|---|---|---|---|---|
| % of pores larger than pore size. | 90% | 80% | 70% | 60% | 50% | 40% | 30% | 20% | 10% | 5% | 2% |

22. A membrane according to claim 1 wherein the coating polymer has at least one of the following characteristics:
  (1) it comprises an acrylate polymer containing at least 40% by weight of units derived from a cycloalkyl acrylate or methacrylate;
  (2) it comprises a fluoropolymer;
  (3) it comprises an acrylate polymer containing units derived from a fluoroalkyl acrylate or methacrylate; and
  (4) it comprises an acrylate polymer containing 10 to 70% of units derived from a polyethylene glycol acrylate or methacrylate.

23. A membrane according to claim 12 wherein the coating polymer has at least one of the following characteristics:
  (1) it comprises an acrylate polymer containing at least 40% by weight of units derived from a cycloalkyl acrylate or methacrylate;
  (2) it comprises an acrylate polymer containing units derived from a fluoroalkyl acrylate or methacrylate; and
  (4) it comprises an acrylate polymer containing 10 to 70% of units derived from a polyethylene glycol acrylate or methacrylate.

24. A gas-permeable membrane which is useful in the packaging of respiring biological materials and which comprises
  (a) a microporous polymeric film comprising a network of interconnected pores such that gases can pass through the film, and
  (b) a polymeric coating on the microporous film, wherein
    (1) the pores in the microporous film have an average pore size of less than 0.24 micron; and
    (2) the microporous film was prepared by a process comprising the steps of
      (A) preparing a uniform mixture comprising a polymeric matrix material in the form of a powder, a finely divided, particulate, substantially water-insoluble filler, and a processing oil;
      (B) extruding the mixture as a continuous sheet;
      (C) forwarding the continuous sheet, without drawing, to a pair of heated calender rolls;
      (D) passing the continuous sheet through the calender rolls to form a sheet lesser thickness;
      (E) passing the sheet from step (D) to a first extraction zone in which the processing oil is substantially removed by extraction with an organic extraction liquid which is a good solvent for the processing oil, a poor solvent for the polymer matrix material, and more volatile than the processing oil;
      (F) passing the sheet from step (E) to a second extraction zone in which the organic extraction liquid is substantially removed by steam or water or both; and
      (G) passing the sheet from step (F) through a forced air dryer to remove residual water and organc extraction liquid; and
    (3) the polymeric coating has a thickness such that the membrane
      (i) has an oxygen permeability (OTR), at all temperatures between 20 and 25 ° C., of at least 775,000 ml/m$^2$.atm.24 hrs (50,000 cc/100 inch$^2$.atm.24 hrs; and
      (ii) has a $CO_2$; $O_2$ permeability ratio (R) of at least 1.5; the OTR and R values being measured at a pressure of 0.035 kg/cm$^2$ (0.5 psi).

25. A membrane according to claim 24 wherein the polymeric matrix material is selected from the group consisting of
  (i) an essentially linear ultrahigh molecular weight polyethylene having an intrinsic viscosity of at least 18 deciliters/g and
  (ii) an essentially linear ultrahigh molecular weight polypropylene having an intrinsic viscosity of at least 6 deciliters/g.

26. A membrane according to claim 24 wherein
  (1) at least 70% of the pores in the microporous film have a pore size of less than 0.24 micron;
  (2) less than 20% of the pores in the microporous film have a pore size less than 0.014 micron; and
  (3) at least 80% of the pores in the microporous film have a pore size less than 0.15 micron.

27. A membrane according to claim 24 which has an OTR of at least 1,550,000 ml.m$^2$.atm.24 hrs (100,000 cc/inch$^2$.atm.24 hrs), and an R ratio of at least 2, the OTR and R values being measured at a pressure of 0.7 kg/cm$^2$ (10 psi).

28. A membrane according to claim 27 which has an OTR of at least 2,325,000 ml/m$^2$.atm.24 hrs (150,000 cc/100 inch$^2$. atm.24 hrs) measured at a pressure of 0.7 kg/cm$^2$ (10 psi).

29. A membrane according to claim 24 wherein the coating polymer comprises a polydimethyl siloxane.

30. A membrane according to claim 24 wherein the coating polymer comprises cis-polybutadiene, poly(4-methylpentene) or ethylene-propylene rubber.

31. A membrane according to claim 24 wherein the coating polymeria has at least one of the following characteristics:
   (1) it comprises an acrylate polymer containing of least 40% by weight of units derived from a cycloalkyl acrylate or methacrylate;
   (2) it comprises a fluoropolymer;
   (3) it comprises an acrylate polymer containing units derived from a fluoroalkyl acrylate or methacrylate; and
   (4) it comprises an acrylate polymer containing 10 70% of units derived from a polyethylene glycol acrylate glycol acrylate or methacrylate.

32. A membrane according to claim 24 wherein the coating polymer has been crosslinked.

33. A membrane according to claim 24 wherein the microporous polymeric film contains pores which are partially by a polymer having a R ratio of less than 1.3 or by a particulate material.

34. A membrane according to claim 24 wherein the filler is a siliceous filler.

35. A package which comprises
   (a) a sealed container, and
   (b) within the sealed container, a respiring biological material and a packaging atmosphere around the biological material; the sealed container including one or more permeable control sections which provide at least the principal pathway for oxygen and carbon dioxide to enter or leave the packaging atmosphere, at least one said permeable control section being a gas-permeable membrane as defined in claim 24.

36. A gas-permeable membrane which is useful in the packaging of respiring biological materials and which comprises
   (a) a microporous polymeric film comprising a network of interconnected pores such that gases can pass through the film, and
   (b) a polymeric coating on the microporous film, wherein
   (1) the pores in the microporous film have an average pore size of less than 0.24 micron;
   (2) at least 70% of the pores in the microporous film have a pore size of less than 0.24 micron;
   (3) less than 20% of the pores in the microporous film have a pore size less than 0.014 micron;
   (4) at least 80% of the pores in the microporous film have a pore size less than 0.15 micron; and
   (5) the polymeric coating has a thickness such that the membrane
      has an oxygen permeability (OTR), at all temperatures between 20° and 25° C., of at least 775,000 ml/m$^2$.atm.24 hrs (50,000 cc/100 inch$^2$.atm.24 hrs; and
   (ii) has a $CO_2/O_2$ permeability ratio (R) of at least 1.5; the OTR and R values being measured at a pressure of 0.035 kg/cm$^2$ (0.5 psi).

37. A membrane accorcding to claim 36 wherein at least 90% of the pores in the microporous film have a pore size less than 0.24 micron.

38. A membrane according to claim 36 wherein at least 80% of the pores in the microporous film have a pore size less than 0.15 micron and at least 70% of the pores in the microporous film have a pore size less than 0.11 micron.

39. A membrane according to claim 36 which has an OTR at all temperatures between 20° C. and 25° C. of at least 1,550,000 ml/m$^2$.atm24 hrs ) and an R ratio of at least 2.5, the OTR and R values being measured at a pressure of 0.035 kg/cm$^2$ (0.5 psi).

40. A membrane according to claim 39 which has an OTR of at least 2,325,000 ml/m$^2$.atm.24 hrs (150,000 ml/m$^2$.atm.24 hrs (150,000 cc/100 inch$^2$.atm.24 hrs) measured at a pressure of 0.7 kg/cm$^2$(10 psi).

41. A membrane according to claim 36 wherein the coating polymer comprises cis-polybutadiene, poly(4-methylpentene) or etyhlene-propylene rubber.

42. A membrane according to claim 36 wherein the coating polymer has at least one of the following characteristics:
   (1) it comprises an acrylate polymer containing at least 40% by weight of units derived from a cycloalkyl acrylate or methacrylate;
   (2) it comprises a fluoropolymer;
   (3) it comprises an acrylate polymer containing units derived from a fluoroalkyl acrylate or methacrylate; and
   (4) it comprises an acrylate polymer containing 10 to 70% of units derived from a polyethylene glycol acrylate or methacrylate.

43. A membrane according to claim 36 wherein the coating polymer has been crosslinked.

44. A package which comprises
   (a) sealed container, and
   (b) within the sealed container, a respiring biological material and a packaging atmosphere around the biological material; the sealed container including one or more permeable control sections which provide at least the principal pathway for oxygen and carbon dioxide to enter or leave the packaging atmosphere, at least one said permeable control section being a gas-permeable membrane which comprises
   (a) a microporous polymeric film comprising a network of interconnected pores such that gases can pass through the film, and
   (b) a polymeric coating on the microporous film, wherein
   (1) the pores in the microporous film have an average pore size of less than 0.24 micron;
   (3) less than 20% of the pores in the microporous film have a pore size less than 0.014 micron;
   (4) at least 80% of the pores in the microporous film have a pore size less than 0.15 micron; and
   (5) the polymeric coating has a thickness such that the membrane
      (i) has an oxygen permeability (OTR) at all temperatures between 20° and 25° C., of at least 775,000 ml/m$^2$.atm.24 hrs (50,000 cc/100 inch$^2$atm.24 hrs); and
      (ii) has a $CO_2/O_2$ permeability ratio(R) of at least 1.5; the OTR and R values being measured at a pressure of 0.035 kg/cm$^2$ (0.5 psi).

45. A package according to claim 44 wherein at least 90% of the pores in the microporous film have a pore size less than 0.24 micron.

46. A package according to claim 44, wherein at least 80% of the pores in the microporous film have a pore size less than 0.15 micron and at least 70% of the pores in the microporous film have a pore size less than 0.11 micron.

47. A package according to claim 44 which has an OTR at all temperatures between 20° C. and 25° C. of at least 1,550,000 ml/m².atm.24 hrs (100,000 cc/inch².atm.24 hrs) and an R ratio of at least 2.5, the OTC and R values being measured at a pressure of 0.035 kg/cm² (0.5 psi).

48. A package according to claim 47 which haas an OTR of at least 2,325,000, ml/m².atm.24 hrs (150,000 cc/100 inch².atm.24 hrs) measured at a pressure of 0.7 kg/cm²(10 psi).

49. A package according to claim 44 wherein the coating polymer comprises cis-polybutadiene, poly(4-methylpentene) or ethylene -propylene rubber.

50. A package accoring to claim 44 wherein the coating at least 40 % by weight of units derived from a cycloalkyl acrylate or methacrylate;
  (1) it comprises an acrylate polymer containing units derived from a fluoroalkyl acrylate or methacrylate; and
  (2) it comprises a fluoropolymer;
  (3) it comprises an acrylate polymer containing units derived from a fluoroalkyl acrylate or methacrylate; and
  (4) it comprises an acrylate polymer containing 10 to 70of units derived from a polyethylene glocol glycol acrylate or methacrylate.

51. A package according to claim 44 wherein the coating polymer has been crosslinked.

52. A package according to claim 44 wherein the microporous polymeric film comprises a polymeric matrix having a siliceous filler dispersed therein.

53. A package according to claim 52 wherein the polymeric matrix is composed of polyethylene and the distribution of pore sizes in the microporous film is as set out in the following table

| Pore Size (microns) | .013 | .016 | .026 | .044 | .058 | .08 | .11 | .15 | .24 | .36 | .6 |
|---|---|---|---|---|---|---|---|---|---|---|---|
| % of pores larger than pore size. | 90% | 80% | 70% | 60% | 50% | 40% | 30% | 20% | 10% | 5% | 2% |

54. A gas-permeable membrane which is useful in the packaging of respiring biological materials and which comprises
  (a) a microporous polymeric film comprising a network of interconnected pores such that gases can pass through the film, and
  (b) a polymeric coating on the microporous film, the coating comprising a polydimethyl siloxane; wherein
  (1) the pores in the microporous film have an average pore size of less than 0.24 micron;
  (2) at least 70% of the pore in the microporous film have a pore size of less than 0.24 micron;
  (3) less than 20% of the pores in the microporous film have a pore size less than 0.014 micron;
  (4) at least 805 of the pores in the microporous film have a pore size less than 0.15 micron; and
  (5) the polymeric coating has a thickness such that the membrane
    (i) has an oxygen permeability (OTR), at all temperatures between 20 % and 25° C., of at least 775,000 ml/m².atm.24hrs (50,000 cc/100 inch².atm.24 hrs; and
    (ii) has a CO₂O₂ permeability ratio(R) of at least 1.5; the OTR and R values being measured at a pressure of 0.035 kg/cm² ().5 psi).

55. A membrane according to claim 54 wherein at least 90% of the pores in the microporous film have a pore size less than 0.24 micron.

56. A membrane according to claim 54 wherein at least 80% of the pores in the microporous film have a pore size less than 0.15 micron and at least 70% of the pores in the microporous film have a pore size less than 0.11 micron.

57. A membrane according to claim 54 which has an OTR at all temperatures between 20° C. and 25° C. of 775,000 to 3,100,000 ml/m².atm.24 hrs and an R ratio of at least 2.5, the OTR and R values being measured at a pressure of 0.035 kg/cm² (0.5 psi).

58. A membrane according to claim 54 which has an OTR of at least 2,325,000 ml/m².atm.24 hrs, measured at a pressure of 0.7 kg/cm² (10 psi).

59. A membrane according to claim 54 wherein the polymeric coating has been crosslinked.

60. A package which comprises
  (a) a sealed container, and
  (b) within the sealed container, a respiring biological material and a packaging atmosphere around the biological material; the sealed container including one or more permeable control sections which provide at least the principal pathway for oxygen and carbon dioxide to enter or leave the packaging atmosphere, at least one said permeable control section being a gas-permeable membrane which comprises
    (a) a microporous polymeric film comprising a network of interconnected pores such that gases can pass through the film, and
    (b) a polymeric coating on the microporous film, the coating comprising a polydimethyl siloxane;
    (1) the pores in the microporous film have an average pore size of less than 0.24 micron;
    (2) at least 70% of the pores in the microporous film have a pore size of less than 0.24 micron;
    (3) less than 20% of the pores in the microporous film have a pore size less than 0.014 micron;
    (4) at least 80% of the pores in the microporous film have a pore size less than 0.15 micron; and
    (5) the polymeric coating has a thickness such that the membrane
      (i) has an oxygen permeability (OTR), at all temperatures between 20°and 25° C., of at least 775,000 ml/m².atm.24 hrs (50,000 cc/100inch².atm.24 hrs; and
      (ii) has a CO₂/O₂ permeability ratio(R) of at least 1.5; the OTR and R values being measured at a pressure of 0.035 kg/cm² (0.5 psi).

61. A package according to claim 60 wherein at least 90% of the pores in the microporous film have a pore size less than 0.24 micron.

62. A package according to claim 60 wherein at least 80% of the pores in the microporous film have a pore size less than 0.15 micron and at least 70% of the pores in the microporous film have a pore size less than 0.11 micron.

63. A package according to claim 60 which has an OTR at all temperatures between 20° C. and 25° C. of 775,000 to 3,100,000 ml/m$^2$.atm.24 hrs and an R ratio of at least 2.5, the OTR and R values being measured at a pressure of 0.035 kg/cm$^2$ (0.5 psi).

64. A package according to claim 60 which had an OTR of at least 2,325,000 ml/m$^2$.atm.24 hrs, measured at a pressure of 0.7 kg/cm$^2$ (10 psi).

65. A package according to claim 60 wherein the polymeric coating has been crosslinked.

* * * * *